US009852313B2

(12) United States Patent
Mignot et al.

(10) Patent No.: US 9,852,313 B2
(45) Date of Patent: Dec. 26, 2017

(54) FUNCTIONAL NODE FOR AN INFORMATION TRANSMISSION NETWORK AND CORRESPONDING NETWORK

(71) Applicants: THALES, Neuilly sur Seine (FR); SYSTEMES EMBARQUES AEROSPATIAUX, Paris (FR)

(72) Inventors: Augustin Mignot, Meudon la Foret (FR); Alexis Dubrovin, Meudon la Foret (FR); Patrice Toillon, Meudon la Foret (FR); Paul Ortais, Paris (FR)

(73) Assignees: Thales, Neuilly sur Seine (FR); Systemes Embarques Aerospatiaux, Paris (FR)

( * ) Notice: Subject to any disclaimer, the term of this patent is extended or adjusted under 35 U.S.C. 154(b) by 151 days.

(21) Appl. No.: 14/663,847

(22) Filed: Mar. 20, 2015

(65) Prior Publication Data

US 2015/0220759 A1 Aug. 6, 2015

Related U.S. Application Data

(63) Continuation of application No. PCT/EP2013/069516, filed on Sep. 19, 2013.

(30) Foreign Application Priority Data

Sep. 21, 2012 (FR) ...................... 12 02525

(51) Int. Cl.
*G06F 21/00* (2013.01)
*G06F 21/82* (2013.01)
(Continued)

(52) U.S. Cl.
CPC ............ *G06F 21/82* (2013.01); *G06F 13/287* (2013.01); *G06F 13/4286* (2013.01); *H04L 12/42* (2013.01); *H04L 2012/421* (2013.01)

(58) Field of Classification Search
None
See application file for complete search history.

(56) References Cited

U.S. PATENT DOCUMENTS 4,763,329 A * 8/1988 Green ................... H04L 12/00
340/2.81
4,956,772 A * 9/1990 Neches ................. G06F 11/202
370/408
(Continued)

FOREIGN PATENT DOCUMENTS

EP 2148474 A1 1/2010
EP 2501079 A1 9/2012
(Continued)

OTHER PUBLICATIONS

International Search Report dated Oct. 10, 2013 for International Patent Application No. PCT/EP2013/069516.

*Primary Examiner* — Maung Lwin
(74) *Attorney, Agent, or Firm* — Knobbe Martens Olson & Bear LLP

(57) ABSTRACT

A functional node for an information transmission network and corresponding network are disclosed. In one aspect, the functional node includes at least one module for distributing messages between input and output ports. The distribution module includes at least one combination of at least three ports, including a first input port connected to a second output port by a first capability for unconditionally propagating messages, not depending on the messages. The first and/or second ports are connected to a third port by a second capability for conditionally propagating messages, depending on the messages.

26 Claims, 2 Drawing Sheets

(51) Int. Cl.
  *H04L 12/42* (2006.01)
  *G06F 13/28* (2006.01)
  *G06F 13/42* (2006.01)

(56) References Cited

U.S. PATENT DOCUMENTS

| | | | | |
|---|---|---|---|---|
| 5,675,736 | A * | 10/1997 | Brady | H04L 29/06 709/239 |
| 5,727,151 | A * | 3/1998 | Sugahara | G06F 15/17 709/207 |
| 6,904,474 | B1 * | 6/2005 | Robertson | G06F 15/17 710/21 |
| 2002/0124182 | A1 * | 9/2002 | Bacso | G06Q 30/02 726/26 |
| 2003/0154427 | A1 * | 8/2003 | Hermann | G06F 11/2005 714/31 |
| 2005/0135425 | A1 * | 6/2005 | Hall | H04L 12/44 370/474 |
| 2006/0215671 | A1 * | 9/2006 | Ortais | G06F 13/385 370/401 |
| 2008/0263318 | A1 * | 10/2008 | May | G06F 9/3851 712/23 |
| 2009/0124329 | A1 * | 5/2009 | Palmisano | G07F 17/32 463/20 |
| 2010/0020828 | A1 * | 1/2010 | Angelow | H04L 12/40032 370/498 |
| 2011/0157473 | A1 * | 6/2011 | Choi | H04N 5/765 348/566 |

FOREIGN PATENT DOCUMENTS

FR         2857805 A1    1/2005
WO    WO 03/073703 A2    9/2003

\* cited by examiner

FUNCTIONAL NODE FOR AN INFORMATION TRANSMISSION NETWORK AND CORRESPONDING NETWORK

CROSS-REFERENCE TO RELATED APPLICATIONS

This application is a continuation of International Application No. PCT/EP2013/069516, filed Sep. 19, 2013, which claims benefit under 35 U.S.C. §119 of French Application No. 12 02525, filed Sep. 21, 2012, which are herein incorporated by reference in their entirety.

BACKGROUND

Field

The described technology generally relates to a functional mode for an information transmission network and a corresponding network.

Description of the Related Technology

Such information transmission networks and such functional nodes are already well known.

In fact, example embodiments of these networks and these nodes are found in many applications, for example applications onboard aircraft or others.

Different types of networks and different corresponding types of functional nodes have then been described.

For example, document FR 2,857,805 describes a data transmission method and device, in which the onboard control computers, for example onboard an air vehicle, are connected to one another in a closed system, i.e., in a loop.

SUMMARY OF CERTAIN INVENTIVE ASPECTS

An objective of certain inventive aspects is to resolve these problems.

To that end, one inventive aspect is a functional node for an information transmission network, comprising at least one module for distributing messages between input and output ports, wherein the distribution module comprises at least one combination, of at least three ports, including a first input port connected to a second output port by a first unconditional propagation capability for unconditionally propagating messages, not depending on the messages, and wherein the first and/or second ports are connected to a third port by a second conditional propagation capability for conditionally propagating messages, depending on the messages.

Additional aspects include features of the node, considered alone or in combination, include:
the third port is an output port connected to the first input port;
the third port is an input port connected to the second output port;
the distribution module further comprises capabilities for analyzing at least some of the messages to control the first unconditional and second conditional propagation capabilities accordingly;
the analyzed message portion is an identification field of that message;
the ports of the or each association are programmable among the ports of the module;
the or each association of ports is programmable;
it comprises several associations of ports programmable independently of one another;
the ports of the or each association and/or the or each association of ports are programmable on a message-by-message basis;
the distribution module is connected to at least one network interface module, internal or external to the node, through one or more local message input and/or output ports, allowing those modules to exchange messages;
at least one association of ports comprises at least one local port;
the distribution module is also connected to the network interface module by an information exchange capability authorizing message insertion by the node;
the insertion authorization information is delivered port by port;
the distribution module is suitable for implementing at least one multiplexing law of the messages resulting from the network interface module intended for the output ports of the node, not depending on the messages;
the network interface module is connected to at least one application module, internal or external to the node;
the distribution module comprises remote input and output ports, for exchanging messages with the outside environment of the node;
the distribution module and/or the network interface module are suitable for implementing, for at least some of the ports, the functions or parts of functions chosen from the group comprising at least the following functions:
classifying messages propagating in the node,
managing repeated transmissions and receptions of a same message,
managing redundancy of the messages transmitted and/or received by the node,
checking the input and/or output integrity on the ports,
checking the throughput on the ports,
checking aging of the messages within the components,
checking message sizes on the ports,
allocating authorizations for message insertions by the node,
observing the usage level of the internal resources of the node;
the allocation of the message insertion authorizations by the node is done on a message-by-message basis;
the distribution module comprises a recognition capability for recognizing messages on at least some of its ports to inhibit the propagation of unrecognized messages; and
said certain ports are ports other than the first and second ports.

Another aspect also relates to an information transmission network, comprising at least one such functional node.

Additional features of the network, considered alone or in combination, include:
it is unidirectional;
it is bidirectional;
it comprises several nodes connected to one another in at least one loop for unconditionally propagating messages;
it comprises several loops; and
at least two loops are interconnected.

BRIEF DESCRIPTION OF THE DRAWINGS

The described technology will be better understood using the following description, provided solely as an example and done in reference to the appended drawings, in which.

DETAILED DESCRIPTION OF THE PREFERRED EMBODIMENT

In this document, a particular information transmission mode is described.

In fact, in this document, it is described that the nodes are connected to each other in an unconditional propagation loop of the information, which then assumes the form of discrete messages propagating from node to node in the network.

In this context, it must be understood that the expression "unconditional propagation of the messages" in fact corresponds to a propagation of the messages that is independent from the messages, i.e., in which the information allowing the propagation of the message from node to node in the network is not carried by that passage.

In fact and in certain functional modes, the propagation of the message is controlled as a function of information of the message, for example a destination address, identification, etc.

However, the structures and operation previously described have a certain number of drawbacks, in particular related to the transmission throughput of the information, resistance to malfunctions, network loss, etc.

As previously indicated, the described technology relates to an information transmission network and corresponding functional nodes connected to one another in the network.

Figure 1:
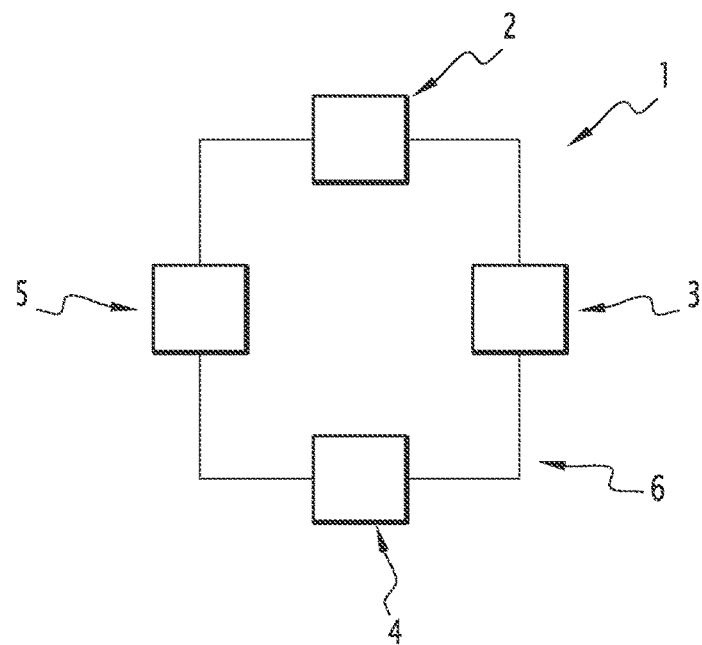
FIG. 1 illustrates an information transmission network in a loop comprising different functional nodes.

Thus for example, and as illustrated in FIG. 1, an information transmission network designated by general reference 1 comprises functional nodes such as the nodes designated by references 2, 3, 4 and 5, connected to an information transmission capability designated by general reference 6.

According to one possible example embodiment, these nodes 2, 3, 4 and 5 are for example formed by computers or other capabilities that are connected to one another for example in the form of at least one loop for unconditionally propagating information.

This information for example assumes the form of discrete messages propagating from node to node in the network.

Of course, this is only one example embodiment of this type of information transmission network.

It will simply be noted in this case that as described in the aforementioned FR document, the expression "unconditionally propagating messages" means that this propagation is independent from the messages, i.e., the information allowing the propagation of the message is not carried by that message.

This is in opposition to conditional propagation of the messages, depending on those messages and in which the information allowing the propagation of the message is carried by it.

This information is for example contained in any part of the message, for instance the identification field of that message, and which for example makes it possible to designate and identify the recipient of the message so as to steer its propagation accordingly.

Of course, these expressions do not rule out the checks, monitoring and other verification operations, etc., which may be implemented traditionally as well, to ensure compliance of the propagated information.

Diagrammatically speaking, the difference between the two propagation modes is that in one case, the propagation of the message is not determined by the message, whereas it is in the other case.

This operation will be described in detail below.

Figure 2:
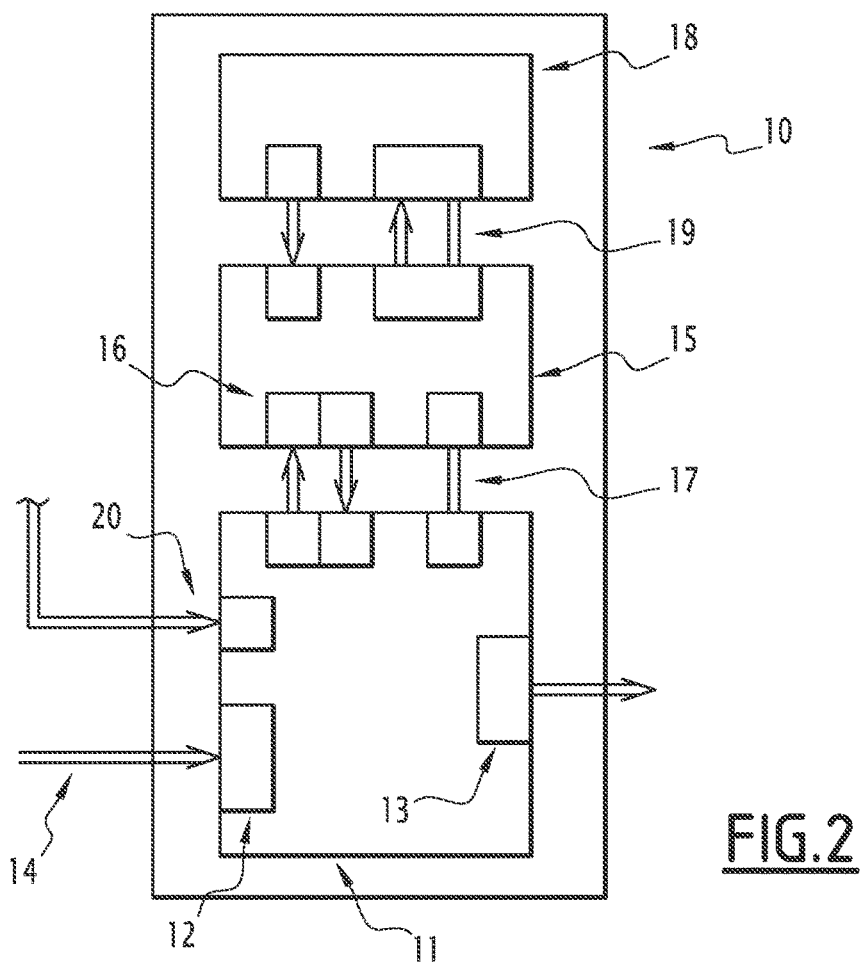
FIG. 2 shows a block diagram illustrating the general structure of one example embodiment of a functional node according to an embodiment, FIG. 3 diagrammatically illustrates an association of ports in the composition of the distribution module of a functional node according to an embodiment.

FIG. 2 shows a block diagram illustrating one example embodiment of a functional node according to an embodiment.

In this FIG. 2, the node is designated by general reference 10 and comprises a certain number of functional modules.

Thus for example, and as illustrated, the functional node 10 may comprise at least one module for distributing messages between input and output ports.

This distribution module is designated by general reference 11 in this FIG. 2, and it comprises input and output ports, two of which are shown and designated for example by references 12 and 13, making it possible to ensure its connection to the information transmission capability designated by general reference 14, of the transmission network.

The structure and operation of this distribution module will be described in more detail below.

The transmission capability may have any appropriate structure and any traditional physical medium.

It will also be noted that this distribution module 11 is connected to a network interface module, internal or external to the node, and which is designated by general reference 15 in this figure.

In this case as well, the distribution module 11 is connected to the network interface module 15 through one or more local message input and/or output ports, allowing those modules to exchange messages.

These message exchange capability between these distribution and network interface modules is designated by general reference 16 in FIG. 2.

As previously indicated, the network interface module 15 may be an internal module to the functional node 10, as illustrated in FIG. 2.

According to another possible embodiment, the network interface module may also be external to the corresponding node, then being remote from it and connected to it by a suitable connection capability.

The distribution module 11 and this network interface module 15 are also affected by an information exchange capability for authorizing the insertion of messages by the node in the network.

The information exchange capability for authorizing insertions is designated by general reference 17 in this figure.

Different embodiments of capabilities for generating this authorization message for the insertion of messages may be considered.

Thus for example, they may assume the form of capabilities forming a clock sending message insertion authorization signals, periodic or otherwise.

Such information may then be delivered node port by node port, to ensure monitoring of the insertions for each one of them independently of one another and to ensure optimal operation of the network, for example in terms of throughput, etc.

As illustrated in FIG. 2 as well, this network interface module 15 is also connected to at least one application module, internal or external to the node, and designated by general reference 18 in that figure.

In the illustrated example, this application module 18 is internal to the functional node 10.

It is then connected to the network interface module through an information exchange capability designated by general reference 19 in FIG. 2.

Of course, an external application module of the functional node and remote from that node may also be considered.

Lastly and as also illustrated in this FIG. 2, it will be noted that the distribution module 11 may also be associated with the outside environment of the node.

In fact, and as illustrated, the distribution module 11 may also comprise remote input and output ports for exchanging messages with the outside environment of the node.

These remote ports are designated by general reference 20 in this FIG. 2 and then allow that node, and more particularly the distribution module 11 of that node 10, to exchange information with the outside environment of the node.

This outside environment of the node may for example comprise at least one other functional node with which the current node is able to exchange information for example.

In light of this description, one can therefore see separations of functionalities between the distribution module, the network interface module and the application module.

In general, these distribution and/or network interface modules are suitable for implementing, for at least some of the ports of the node, functions or parts of functions, some of which are generally found in the standard implementation.

Thus for example, functions may be cited that can be implemented and are chosen from the group comprising at least the following functions:
  classifying messages propagating in the node,
  managing repeated transmissions and receptions of a same message,
  managing redundancies of the messages transmitted and/or received by the node,
  checking the input and/or output integrity on the ports,
  checking the throughput on the ports,
  checking aging of the messages within the components,
  checking message sizes on the ports,
  allocating authorizations for message insertions by the node,
  observing usage levels of the internal resources of the node,
  etc.

Of course, other functions may also be considered.

In this context, the allocation of authorizations for message insertions by the node may be done on a message-by-message basis, by associating a group or set of messages in elementary data streams, managed individually and in a partitioned manner relative to one another, etc.

Furthermore, the distribution module 11 may also comprise a recognition capability for recognizing the messages over at least some of its ports to inhibit the propagation of unrecognized messages.

Lastly, it may also be noted that the distribution module 11 can be adapted to implement at least one multiplexing law of the messages coming from the network interface module 15 and intended for output ports, for example 13, of the node, not depending on the messages.

Such a law may then also not be preemptive.

Figure 3:
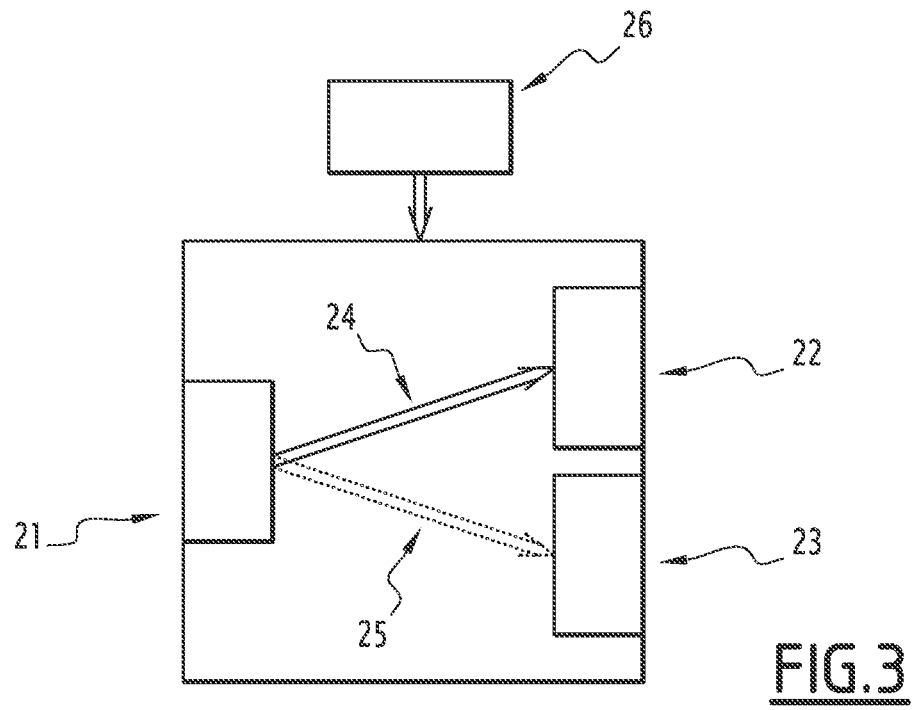

FIG. 3 shows an example embodiment of an association of at least three ports in the composition of the distribution module of a functional node according to an embodiment.

In fact, a distribution module of a functional node according to the embodiment of FIG. 3 comprises at least one association of at least three ports designated by general references 21, 22 and 23 in that figure.

In fact, these three ports comprise a first input port designated by general reference 21, connected to a second output port designated by general reference 22, by a first unconditional propagation capability for unconditionally propagating messages, not depending on those messages, the first unconditional propagation capability being designated by general reference 24 in that figure.

In the example illustrated in FIG. 3, the first input port 21 is also connected to the third port 23, which is then an output port, by a second conditional propagation capability for conditionally propagating messages, depending on the messages, the second conditional propagation capability being designated by general reference 25 in that figure.

As previously indicated, the unconditional propagation of messages, not depending on the messages, and conditional propagation of messages, depending on the messages, must be interpreted in the following sense.

For the first unconditional propagation capability 24, the propagation of the messages is not related to propagation information carried by those messages, unlike the second conditional propagation capability 25, which are driven to ensure propagation of messages based on propagation information carried by the messages.

In fact, it is possible to define one or more associations of ports of this type in the distribution module, to ensure the corresponding propagation of the messages between the associated ports.

In the described example, the third port 23 is an output port connected to the first input port 21.

Of course, other configurations may be considered, this third port 23 also being able to be connected to the second output port 22, through a capability for conditionally propagating messages, depending on the messages, this third port 23 then being an input port connected to an output port of the module.

According to still another alternative, the third port may also be connected to two other ports by a corresponding information transmission capability.

The latter are then driven based on the input and/or output propagation needs.

Associating ports means that it is possible to associate ports connected using an information transmission capability, or other ports, such as at least one local port previously described, for example.

The operation of this assembly is then driven by an analysis capability using some of the messages making it possible to control the second conditional propagation capability accordingly.

In this FIG. 3, the analysis capability is designated by general reference 26.

The analysis capability is then adapted to analyze at least part of the messages, for example such as the identification field of that message, to ensure driving of the rest of the capabilities in order to control the propagation of the message as a function of the results of that analysis.

As previously indicated, the distribution module may comprise one or more combinations of ports of this nature.

Of course, the aforementioned ports can for example be chosen in a programmable manner for the or each association of ports, among the different ports of the module and the node.

Likewise, the or each association of ports of the distribution module may be programmable.

These associations may then be programmable independently of one another for example.

As an example, the ports of the or each association and/or the or each association of ports are programmable, for example on a message-by-message basis.

One can then see that in the context described in the aforementioned FR document of unconditionally transmitting messages in a loop, the functional node described above, in particular the distribution module described above in light of this FIG. 3, make it possible to ensure such an operation and propagation mode of the messages from node to node.

For example, the first unconditional propagation capability 24 between the input port 21 and the output port 22 make it possible to ensure the unconditional transmission of the messages from node to node, i.e., independently of the message.

Furthermore, the capabilities may be associated with other propagation capabilities, such as the second conditional propagation capability 25 for conditionally propagating messages to another output port, for example 23.

Figure 4:
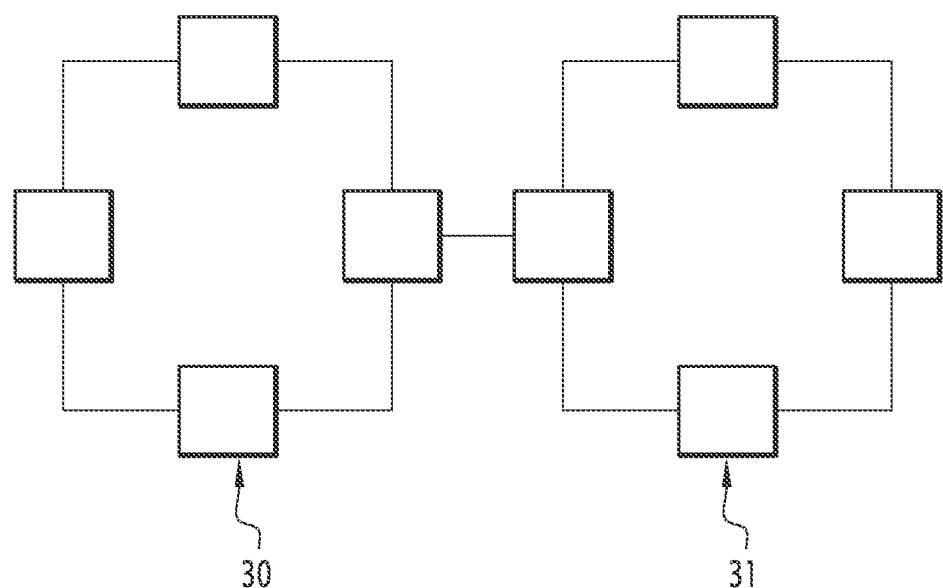
FIG. 4 illustrates an example embodiment of interconnected information transmission loops, in the composition of a transmission network.

Such capabilities and such nodes may then, as already mentioned, be incorporated into loops for conditionally propagating messages as for example illustrated in FIG. 4.

In fact, this FIG. 4 shows two loops 30 and 31, respectively, of functional nodes connected to one another by an information transmission capability.

These loops are for example interconnected by a transmission link between two nodes.

As also already mentioned in the prior FR document, these information transmission loops may then be unidirectional or bidirectional, for messages propagating in a single direction or in both travel directions on the information transmission capability of the network.

Of course, many other embodiments of these nodes and this network may be considered.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A functional node for an information transmission network, comprising:
   at least one distribution module, executed by a computer in the functional node, configured to distribute messages between input and output ports,
   wherein the distribution module comprises at least one association of at least three ports, including a first input port connected to a second output port by a first unconditional propagation link for unconditionally propagating messages, not depending on the messages,
   wherein the first and/or second ports are connected to a third port by a second conditional propagation link for conditionally propagating messages, depending on the messages,
   wherein the first unconditional propagation link and the second conditional propagation link are distinct from one another and form two different ways for message distribution between the corresponding ports of the functional node,
   wherein the first unconditional propagation link and the second conditional propagation link are configured to be operated simultaneously, and
   wherein the distribution module is configured to implement, for at least some of the ports, the functions:
      managing repeated transmissions and receptions of a same message,
      managing redundancy of the messages transmitted and/or received by the functional node, and
      observing usage levels of the internal resources of the functional node.

2. The functional node of claim 1, wherein the third port is an output port connected to the first input port.

3. The functional node of claim 1, wherein the third port is an input port connected to the second output port.

4. The functional node of claim 1, wherein the distribution module further comprises an analyzing capability for analyzing at least some of the messages to control the second conditional propagation link accordingly.

5. The functional node of claim 4, wherein the analyzed message portion is an identification field of that message.

6. The functional node of claim 1, wherein the at least three ports of the association are programmable among the ports of the module.

7. The functional node of claim 6, wherein the at least three ports of the association and/or the association of the at least three ports are programmable on a message-by-message basis.

8. The functional node of claim 1, wherein the association of the at least three ports is programmable.

9. The functional node of claim 8, further comprising several associations of at least three ports programmable independently of one another.

10. The functional node of claim 1, wherein the distribution module is connected to at least one network interface module, internal or external to the functional node, through one or more local message input and/or output ports, allowing those modules to exchange messages.

11. The functional node of claim 10, wherein at least one association of ports comprises at least one local port.

12. The functional node of claim 11, wherein the network interface module is connected to at least one application module, internal or external to the functional node.

13. The functional node of claim 10, wherein the distribution module is also connected to the network interface module by an information exchange capability authorizing message insertion by the functional node.

14. The functional node of claim 13, wherein the insertion authorization information is delivered port by port.

15. The functional node of claim 10, wherein the distribution module is configured to implement at least one multiplexing law of the messages resulting from the network interface module intended for the output ports of the functional node, not depending on the messages.

16. The functional node of claim 1, wherein the distribution module comprises remote input and output ports configured to exchange messages with the outside environment of the functional node.

17. The functional node of claim 1, wherein the distribution module is configured to implement, for at least some of the ports, the functions or parts of functions chosen from at least one of the following functions:
- classifying messages propagating in the functional node,
- checking input and/or output integrity on the ports,
- checking throughput on the ports,
- checking aging of the messages within the components,
- checking message sizes on the ports, and
- allocating authorizations for message insertions by the functional node.

18. The functional node of claim 17, wherein the allocation of the message insertion authorizations by the functional node is done on a message-by-message basis.

19. The functional node of claim 1, wherein the distribution module comprises a recognition capability for recognizing messages on at least a subset of the distribution module's ports to inhibit the propagation of unrecognized messages.

20. The functional node of claim 19, wherein the subset of the distribution module's ports are ports other than the first and second ports.

21. An information transmission network, comprising at least one functional node of claim 1.

22. The information transmission network of claim 21, wherein the network is unidirectional.

23. The information transmission network of claim 21, wherein the network is bidirectional.

24. The information transmission network of claim 21, comprising several functional nodes connected to one another in at least one loop for unconditionally propagating messages.

25. The information transmission network of claim 24, comprising several loops.

26. The information transmission network of claim 25, wherein at least two loops are interconnected.

* * * * *